(12) United States Patent
Huang

(10) Patent No.: US 8,798,114 B2
(45) Date of Patent: Aug. 5, 2014

(54) SYSTEM AND METHOD FOR DUAL CHIRP MODULATION

(71) Applicant: Princeton Technology Corporation, New Taipei (TW)

(72) Inventor: Ruei-Ran Huang, New Taipei (TW)

(73) Assignee: Princeton Technology Corporation, New Taipei (TW)

( * ) Notice: Subject to any disclaimer, the term of this patent is extended or adjusted under 35 U.S.C. 154(b) by 0 days.

(21) Appl. No.: 13/836,705

(22) Filed: Mar. 15, 2013

(65) Prior Publication Data

US 2014/0086280 A1 Mar. 27, 2014

(30) Foreign Application Priority Data

Sep. 24, 2012 (TW) .............................. 101134867 A

(51) Int. Cl.
*H04B 1/00* (2006.01)
*H04L 27/10* (2006.01)
(52) U.S. Cl.
CPC .................................. *H04L 27/103* (2013.01)
USPC ....................................................... 375/139
(58) Field of Classification Search
CPC ................................................... H04L 27/103
USPC ....................................................... 375/139
See application file for complete search history.

(56) References Cited

U.S. PATENT DOCUMENTS

| 5,724,383 | A | * | 3/1998 | Gold et al. ..................... | 375/141 |
| 6,337,756 | B1 | * | 1/2002 | Djupsjobacka ............... | 398/183 |
| 2008/0310481 | A1 | * | 12/2008 | Schaffner ....................... | 375/139 |
| 2009/0110096 | A1 | * | 4/2009 | Koga et al. ..................... | 375/260 |
| 2009/0310699 | A1 | * | 12/2009 | Kodama et al. ................ | 375/267 |
| 2012/0300814 | A1 | * | 11/2012 | Schaffner ....................... | 375/139 |
| 2013/0051432 | A1 | * | 2/2013 | Hiscock ......................... | 375/139 |
| 2013/0070821 | A1 | * | 3/2013 | Lai et al. ....................... | 375/219 |

OTHER PUBLICATIONS

Kim, "Dual chirped optical pulses from a phase-modulated laser", 2007.*

\* cited by examiner

*Primary Examiner* — Juan A Torres
(74) *Attorney, Agent, or Firm* — Muncy, Geissler, Olds & Lowe, P.C.

(57) ABSTRACT

A system for dual chirp modulation includes a transmission unit, a receiving unit, and a transmission channel. A modulation module of the transmission unit is configured to receive binary data and modulate the binary data by a first dual chirp sequence and a second dual chirp sequence for generating an output signal. Then the output signal is converted from digital form to analog form by a digital to analog converter. A transmission channel is configured to receive the output signal converted to analog form, wherein the output signal converted to analog folio passes the transmission channel for generating a received signal. An analog to digital converter converts the received signal from analog form to digital form and a demodulation module demodulates the received signal with digital form, by the first dual chirp sequence and the second dial chirp sequence, for recovering the binary data.

10 Claims, 6 Drawing Sheets

SYSTEM AND METHOD FOR DUAL CHIRP MODULATION

CROSS REFERENCE TO RELATED APPLICATIONS

This Application claims priority of Taiwan Patent Application No. 101134867, filed on Sep. 24, 2012, the entirety of which is incorporated by reference herein.

BACKGROUND OF THE INVENTION

1. Field of the Invention

The disclosure is related to the modulation technology of communication, and, more particularly, to modulation by dual chirp modulation.

2. Description of the Related Art

Modulation is meant that signals are carried by carriers for modulating. An original signal may be converted into an appropriate electric wave signal by modulation. In addition, the frequency of the signal may shift to any other frequency in frequency spectrum by modulation for transmitting the signal easily and utilizing the frequency spectrum effectively. Modulation is often used in wireless communications, data transmissions via telephone line and so on.

BRIEF SUMMARY OF THE INVENTION

An embodiment of the invention provides a dual chirp modulation system, including: a transmission unit, comprising: a modulation module, configured to receive binary data and modulate the binary data by a first chirp sequence and a second chirp sequence for generating an output signal; and a digital to analog converter, converting the output signal from digital form to analog form; a transmission channel, receiving the output signal converted to analog form, wherein the output signal converted to analog form passes the transmission channel to generate a receipt signal; and a receiving unit, including: an analog to digital converter, configured to convert the receipt signal from analog form to digital form; and a demodulation module, configured to demodulate the receipt signal, which is converted to digital form, by the first chirp sequence and the second chirp sequence, for recovering the binary data.

An embodiment of the invention provides a dual chirp modulation method, including: modulating binary data by a first chirp sequence and a second chirp sequence for generating an output signal; converting the output signal from digital form to analog form; receiving the output signal converted to analog form through a transmission channel, wherein the output signal converted to analog form passes the transmission channel to generate a receipt signal; converting the receipt signal from analog form to digital form; demodulating the receipt signal, which is converted to digital form, by the first chirp sequence and the second chirp sequence, for recovering the binary data.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
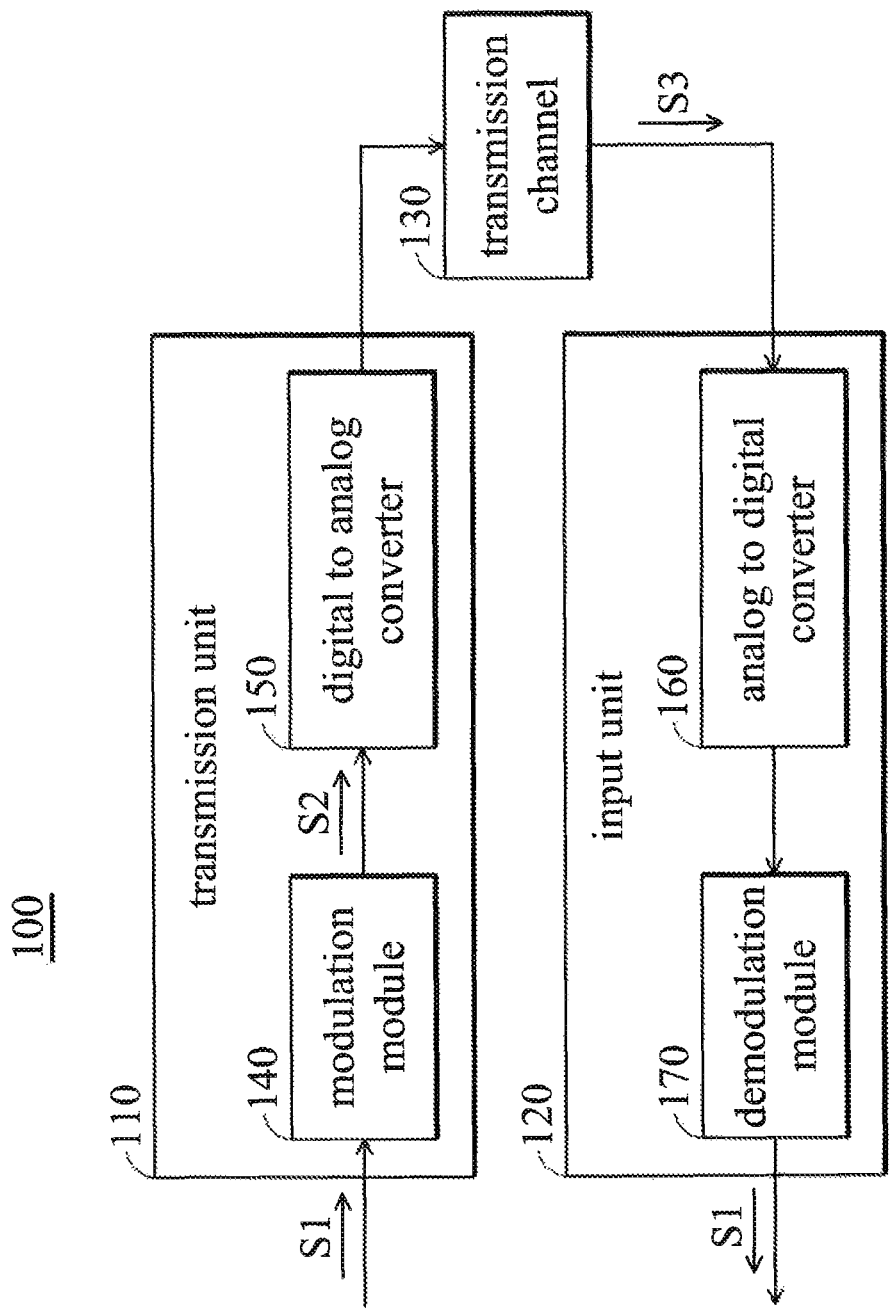
FIG. 1 is a schematic diagram illustrating the dual chirp modulation system 100 according to an embodiment of the invention.

FIG. 1 is a schematic diagram illustrating the dual chirp modulation system 100 according to an embodiment of the invention. In the FIG. 1, the dual chirp modulation system 100 includes a transmission unit 110, a receiving unit and a transmission channel.

Figure 2A:
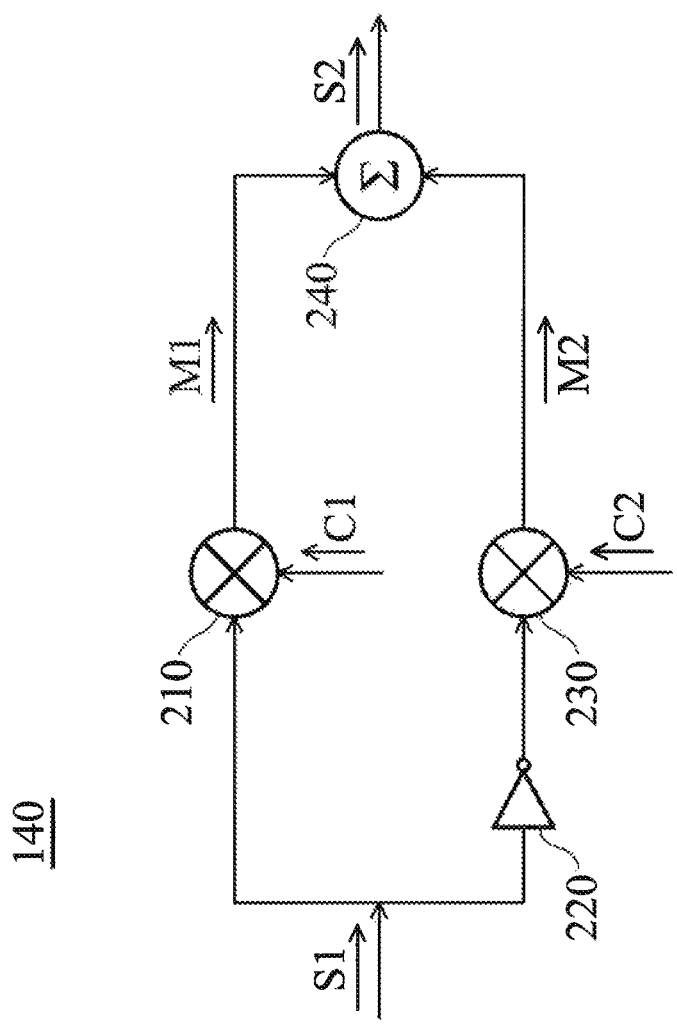
FIG. 2A is a schematic diagram illustrating the modulation module 140 according to an embodiment of the invention.

In an embodiment of the invention, the transmission unit comprises a modulation module 140, and a digital to analog converter (DAC) 150. The modulation module 140 is configured to receive binary data S1 and modulate the binary data S1 by a first chirp sequence C1 and a second chirp sequence C2 for generating an output signal S2. In the following, the detailed process of the modulation module 140 will be illustrated with reference to FIG. 2A. FIG. 2A is a schematic diagram illustrating the modulation module 140 according to an embodiment of the invention. The modulation module 140 includes a first multiplier 210, an inverter 220, a second multiplier 230 and an accumulator 240. The first multiplier 210 is configured to multiply the binary data S1 and the first chirp sequence C1 for generating a first modulated signal M1. The second multiplier 230 is configured to multiply the output of inverter 220 with the second chirp sequence C2 for generating a second modulated signal M2, wherein the output of inverter 220 is the inverted version of the binary data S1 by the inverter 220. Finally, the accumulator 240 receives the first modulated signal M1 and the second modulated signal M2 for generating the output signal S2. In an embodiment of the invention, the first chirp sequence C1 is indicative that the binary data S1 is 0 and a second chirp sequence C2 is indicative that the binary data S1 is 1.

In an embodiment of the invention, the output signal S2 is converted from digital form to analog form and the output signal S2 which is converted to analog form by the digital to analog converter 150 is transmitted to the transmission channel 130. The transmission channel 130 receives the output signal S2 converted to analog form to generate a receipt signal S3. In an embodiment of the invention, the transmission channel 130 is a power line channel.

Figure 2B:
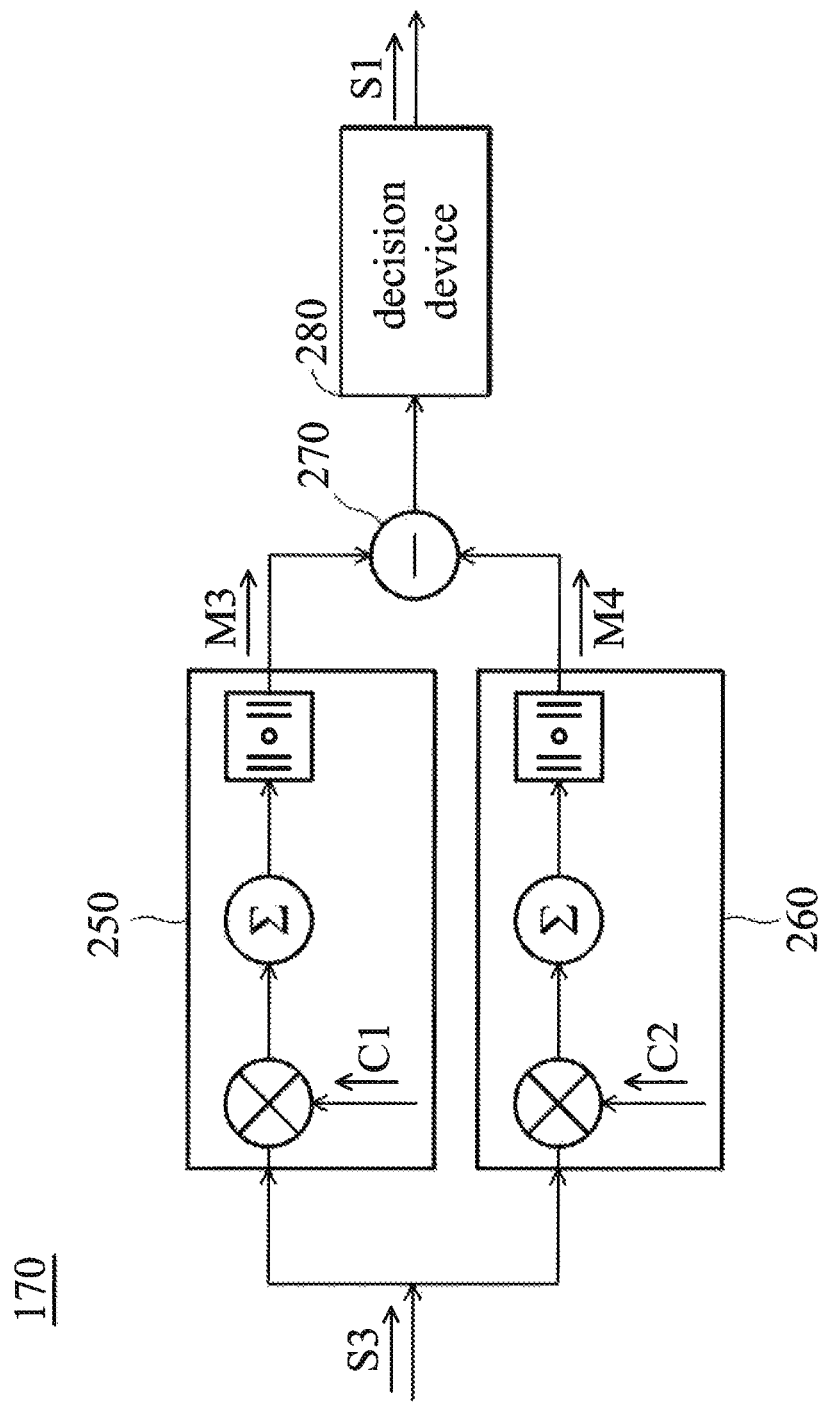
FIG. 2B is a schematic diagram illustrating the demodulation module 170 according to an embodiment of the invention.

In an embodiment of the invention, the receiving unit 120 comprises an analog to digital converter (ADC) 160 and a demodulation module 170. The receiving unit 120 receives the receipt signal S3 via the analog to digital converter 160. The receipt signal S3 is converted from analog fool to digital form by the analog to digital converter 160. The demodulation module 170 demodulates the receipt signal S3 which is convened to digital form, by the first chirp sequence C1 and the second chirp sequence C2 to recover the binary data S1 from the receipt signal S3. In following, the detailed process of the demodulation module 170 will be illustrated with reference to FIG. 2B. FIG. 2B is a schematic diagram illustrating the demodulation module 170 according to an embodiment of the invention. The demodulation module 170 includes a first correlator 250, a second correlator 260, a subtractor 270 and a decision device 280. The first correlator 250 is configured to multiply the receipt signal S3 with the first chirp sequence C1, accumulate the multiplied product and measure the absolute value of the accumulated product for generating a first demodulated signal M3. The second correlator 260 is configured to multiply the receipt signal S3 with the second chirp sequence C2, accumulate the multiplied product and measure the absolute value of the accumulated product for generating a second demodulated signal M4. The subtractor 270 is configured to subtract the second demodulated signal M4 from the first demodulated signal M3. The decision device 280 is configured to recover the binary data S1 according to a subtracted difference from the subtractor 270. The determination of the binary data S1 being 0 is performed by the decision device 280 when the subtracted difference is larger than 0. The determination of the binary data S1 being 1 is performed by the decision device 280 when the subtracted difference is smaller than 0.

Figure 3:
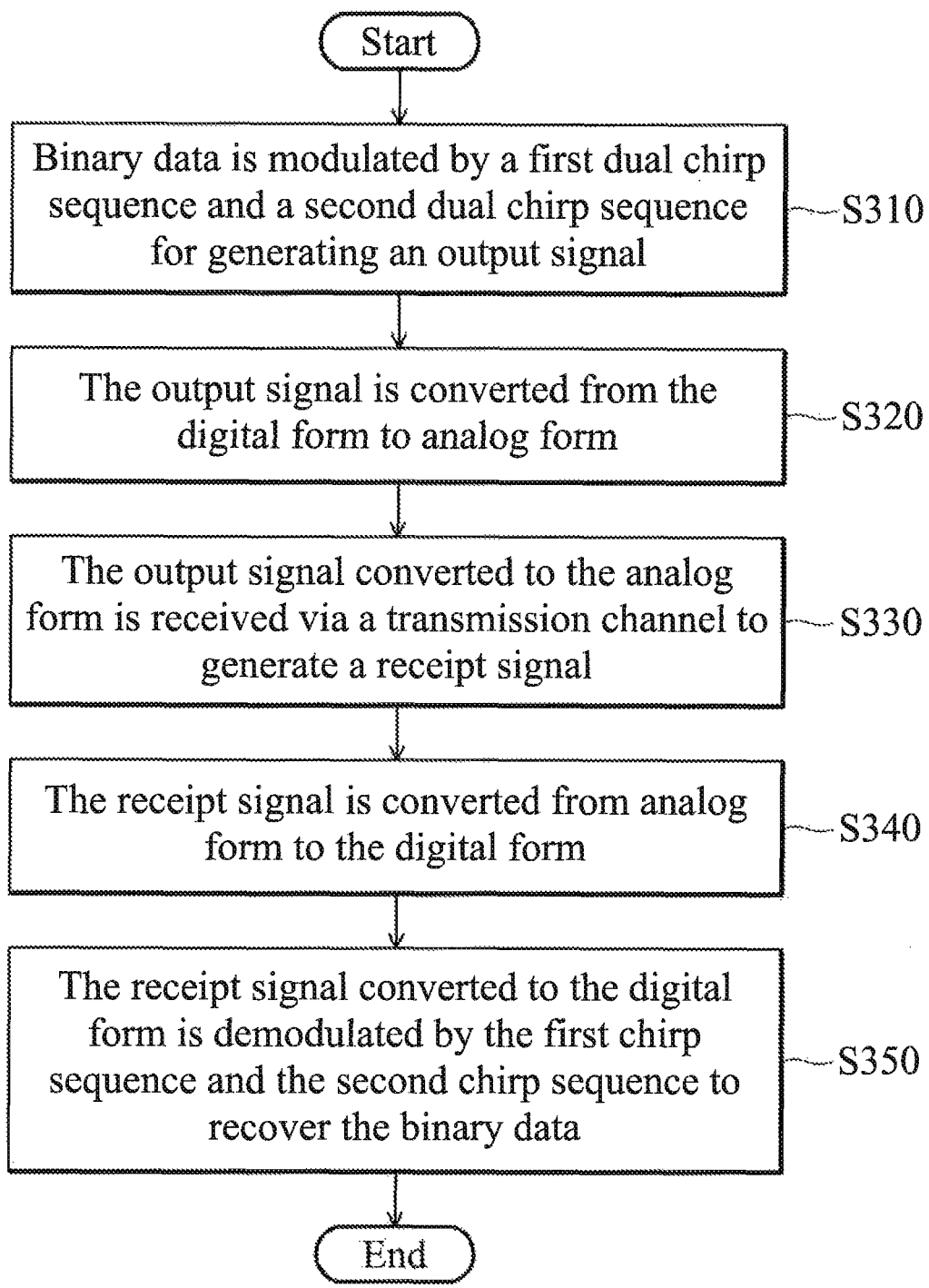
FIG. 3 is a flowchart 300 of method of the dual chirp modulation method according to an embodiment of the invention.

FIG. 3 is a flowchart 300 of method of the dual chirp modulation method according to an embodiment of the invention. Firstly, in step S310, binary data is modulated by a first chirp sequence and a second chirp sequence for generating an output signal. In step S320, the output signal is converted from the digital form to analog form. In step S330, the output signal converted to the analog form is received via a transmission channel to generate a receipt signal. In step S340, the receipt signal is converted from analog form to the digital form. In step S350, the receipt signal converted to the digital form is demodulated by the first chirp sequence and the second chirp sequence to recover the binary data.

Figure 4:
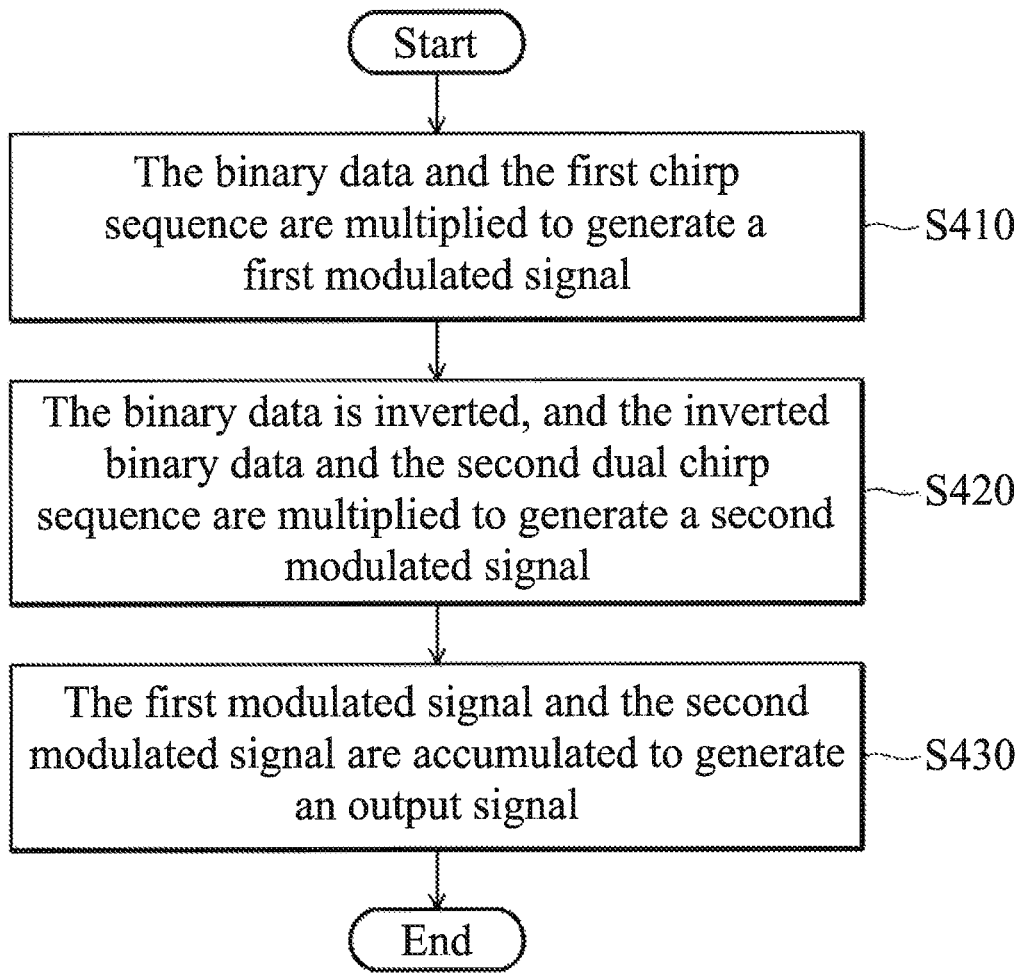
FIG. 4 is a flowchart 400 of the modulation process of the dual chirp modulation method according to an embodiment of the invention.

FIG. 4 is a flowchart 400 of the modulation process of the dual chirp modulation method according to an embodiment of the invention. In step S410, the binary data and the first chirp sequence are multiplied to generate a first modulated signal. In step S420, the binary data is inverted, and the inverted binary data and the second dual chirp sequence are multiplied to generate a second modulated signal. In step S430, the first modulated signal and the second modulated signal are accumulated to generate an output signal.

Figure 5:
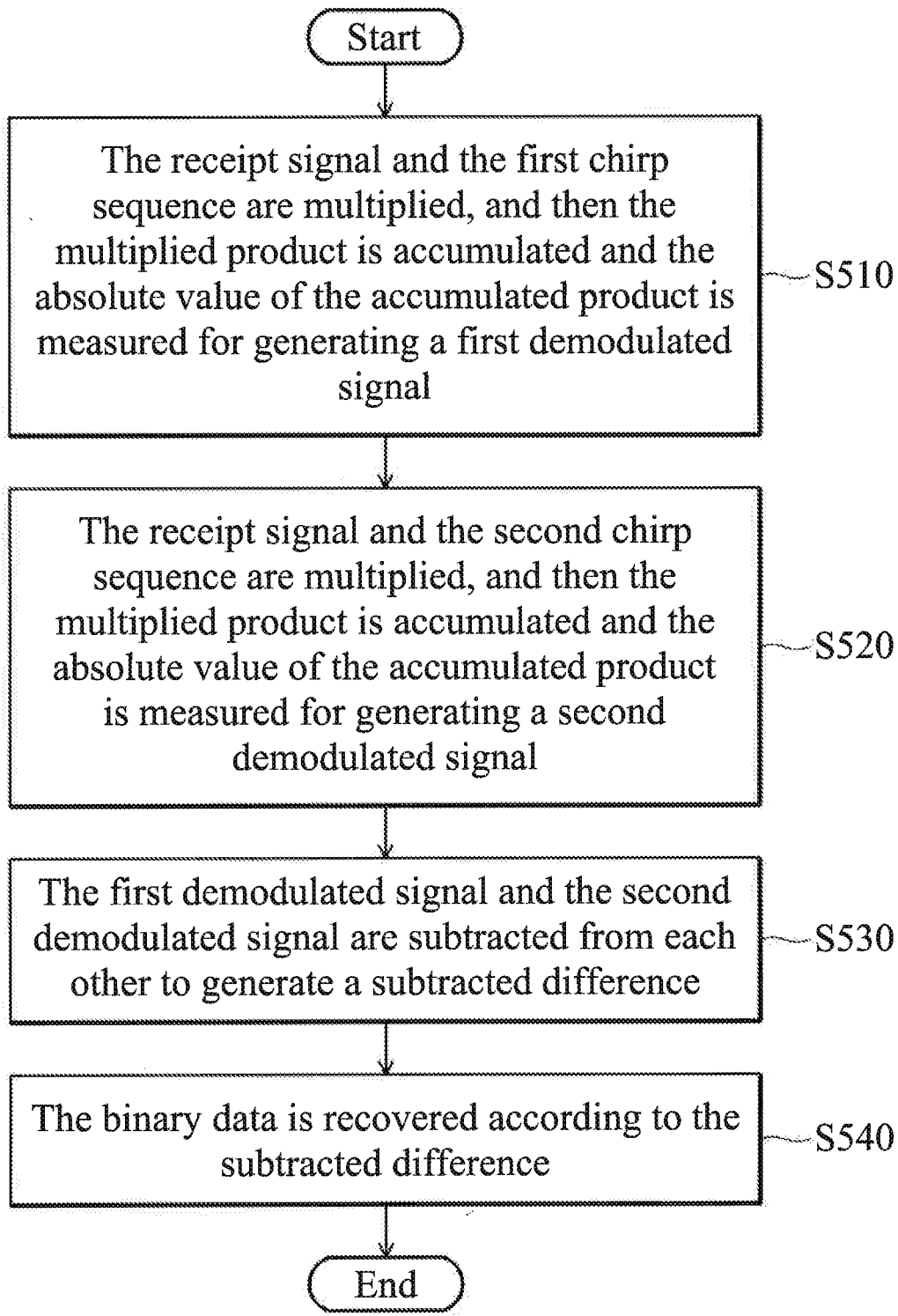
FIG. 5 is a flowchart 500 of the demodulation process of the dual chirp modulation method according to an embodiment of the invention.

FIG. 5 is a flowchart 500 of the demodulation process of the dual chirp modulation method according to an embodiment of the invention. In step S510, the receipt signal and the first chirp sequence are multiplied, and then the multiplied product is accumulated and the absolute value of the accumulated product is measured for generating a first demodulated signal. In step S520, the receipt signal and the second chirp sequence are multiplied, and then the multiplied product is accumulated and the absolute value of the accumulated product is measured for generating a second demodulated signal. In step S530, the first demodulated signal and the second demodulated signal are subtracted from each other to generate a subtracted difference, in step S540, the binary data is recovered according to the subtracted difference.

With the dual chirp modulation method of the invention, the transmitted signals are modulated and demodulated by dual chirp sequences, therefore the transmitted signals may be transmitted via the same frequency band, and the utilization of the bandwidth is increased. In addition, the dual chirp modulation method of the invention may be applied in power line communications to prevent the frequency selectivity from fading as a result of multipath interference in power line communications.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dual chirp modulation system, comprising:
   a transmission unit, comprising:
      a modulation module, configured to receive binary data and modulate the binary data by a first chirp sequence and a second chirp sequence for generating an output signal; and
      a digital to analog converter, converting the output signal from digital form to analog form;
   a transmission channel, receiving the output signal converted to analog form, wherein the output signal converted to analog form passes the transmission channel to generate a receipt signal; and
   a receiving unit, comprising:
      an analog to digital converter, configured to convert the received signal from analog form to digital form; and
      a demodulation module, configured to demodulate the receipt signal, which is converted to digital form, by the first chirp sequence and the second chirp sequence, for recovering the binary data.

2. The system of claim 1, wherein the first chirp sequence is indicative that the binary data is 0 and a second chirp sequence is indicative that the binary data is 1.

3. The system of claim 1, wherein the modulation module comprises:
   a first multiplier, configured to multiply the binary data and the first chirp sequence to generate a first modulated signal;
   an inverter, inverting the binary data to generate inverted binary data;
   a second multiplier, configured to multiply the inverted binary data and the second chirp sequence to generate a second modulated signal; and
   an accumulator, receiving the first modulated signal and the second modulated signal for generating the output signal.

4. The system of claim 1, wherein the demodulation module comprises:
   a first correlator, configured to multiply the receipt signal and the first chirp sequence, accumulate the multiplied product produced thereof and measure the absolute value of the multiplied product, for generating a first demodulated signal;
   a second correlator, configured to multiply the received signal and the second dual chirp sequence, accumulate the multiplied product produced thereof and measure the absolute value of the multiplied product, for generating a second demodulated signal;
   a subtractor, configured to subtract the second demodulated signal from the first demodulated signal; and
   a decision device, configured to recover the binary data according to a subtracted difference from the subtractor.

5. The system of claim 1, wherein the transmission channel is a power line channel.

6. A dual chirp modulation method, comprising the steps of:

modulating binary data by a first chirp sequence and a second chirp sequence for generating an output signal;

converting the output signal from digital form to analog form;

receiving the output signal converted to analog form through a transmission channel, wherein the output signal converted to analog form passes the transmission channel to generate a receipt signal;

converting the receipt signal from analog form to digital form; and demodulating the receipt signal, which is converted to digital form, by the first chirp sequence and the second chirp sequence, for recovering the binary data.

7. The method of claim 6, wherein the first chirp sequence is indicative that the binary data is 0 and a second chirp sequence is indicative that the binary data is 1.

8. The method of claim 6, further comprising the steps of:

multiplying the binary data and the first chirp sequence by a first multiplier to generate a first modulated signal;

multiplying an inverted version of the binary data and the second chirp sequence by a second multiplier for generating a second modulated signal; and accumulating the first modulated signal and the second modulated signal by an accumulator to generate an output signal.

9. The method of claim 6, further comprising the steps of:

multiplying the receipt signal and the first chirp sequence, accumulating the multiplied product produced thereof and measuring the absolute value of the multiplied product, by a first correlator to generate a first demodulated signal;

multiplying the receipt signal and the second chirp sequence, accumulating the multiplied product produced thereof and measuring the absolute value of the multiplied product, by a second correlator to generate a second demodulated signal;

subtracting the second demodulated signal from the first demodulated signal by a subtractor; and recovering the binary data by a decision device according to a subtracted difference from the subtractor.

10. The method of claim 6, wherein the transmission channel is a power line channel.

* * * * *